3,020,273
PROCESS FOR THE PREPARATION OF DIGLY-COSYLUREAS AT REDUCED PRESSURE

Thomas R. Steadman, Kensington, and Paul R. Steyermark, Takoma Park, Md., assignors to W. R. Grace & Co., New York, N.Y., a corporation of Connecticut
No Drawing. Filed Mar. 29, 1960, Ser. No. 18,269
6 Claims. (Cl. 260—211.5)

This invention relates to a process for the preparation of diglycosylureas or, more properly, 1,3-diglycosylureas. In one specific embodiment this invention relates to a process for the preparation of 1,3-diglycosylureas by the reaction of two moles of an aldose with one mole of urea at a reduced pressure and in a lower aliphatic acid medium.

Diglucosylurea, one of the members of this class of compounds, is of interest in several fields. The most promising use for this compound is in the preparation of long chain diglucosylurea esters suitable for use in detergent formulations. These esters are prepared by an alcoholysis reaction between diglucosylurea and an ester of a fatty acid of the general formula

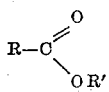

where R is an alkyl, alkenyl or alkadienyl radical having from 7 to 23 carbon atoms and R' is a lower alkyl radical up to and including hexyl. Generically, these compounds are described as mono-fatty acids of diglucosylureas. Typical examples of such esters include the laurate, oleate, palmitate, etc. Diglucosylurea compounds have also been disclosed as useful supplements in compositions for feeding cattle.

We have discovered that the reaction of at least two moles of an aldose with one mole of urea in a lower aliphatic acid medium at a temperature of about 60 to 110° C. at a pressure of about 200 to 600 mm. of mercury gives an improved yield of diglycosylureas. The yield of the product may be further improved by the use of certain catalysts. The reaction is illustrated, for example, by the reaction of glucose and urea by the equation:

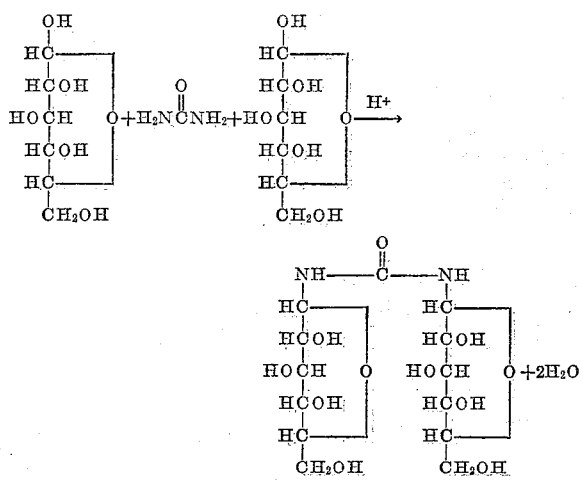

In the operation of the process of our invention, the aldose and urea are dissolved in the organic acid which is heated at atmospheric pressure to about 90 to 95° C. for a period of time sufficient to dissolve the reactants. The dissolution is hastened and the general reaction catalyzed by the use of certain catalysts such as boric acid, for example. The pressure is decreased to about 300 mm. of mercury and the water formed in the reaction together with part of the acetic acid is distilled from the reaction mixture. Fresh acetic acid is added during the reaction to make up for the loss of the solvent. The reaction of the aldose with urea in a non-aqueous medium at reduced pressure is more satisfactory than the reaction in a non-aqueous medium alone. The reaction in the non-aqueous medium reduces the hydrolysis and the tendency toward degradation of the reactants.

The reaction is reversible and the water formed in the reaction may hydrolyze the diglycosylurea to the aldose and urea in the presence of an acid. When the water is removed as the reaction progresses, the equilibrium is shifted toward the desired diglycosylurea. The removal of water by distillation cannot be accomplished at normal pressures because a temperature of 115° C. or higher would be necessary. Considerable degradation of the reactants would occur at this temperature. However, by reducing the pressure at which the reaction is carried out, the removal of water can be accomplished at temperatures on the order of 60 to 90° C. The yield of diglucosylurea is thus considerably improved. The most important conditions in this reaction are the operation in a non-aqueous medium and at reduced pressure. The addition of boric acid or other suitable catalysts hastens the dissolution of the reactants in the reaction medium and also improves the yield of the desired diglycosylurea.

Choice of the reaction medium should be made on the basis of the properties of the aldose chosen. The reaction will proceed satisfactorily in the presence of any lower aliphatic acid such as, for example, acetic, propionic, butyric, etc. Because of the properties and availability of glacial acetic acid, it is the preferred medium for the reaction. The diglycosylureas can be prepared by the reaction of urea with any aldose, for example, glucose, mannose, galactose, rhamnose, arabinose, xylose, etc. The diglucosylureas are of the most commercial interest at the present time so that D-glucose is the preferred aldose for the reaction of our invention. The aldose selected is reacted with commercially available urea.

We have also found that the yield of the product is greatly improved if the reaction is carried out at reduced pressure and in the presence of certain catalysts. The principal catalytic effect is possibly due to the improvement in the dissolution rate of the reactants in the reaction mixture. The reactants are subjected to increased temperatures for shorter periods of time and thus, possibly some of the degradation of the reactants that had taken place formerly is eliminated by use of catalyst such as boric acid, for example. Another possible explanation for the effectiveness of boric acid and catalysts of the same type might reside in the fact that boric acid forms positively charged complexes with polyhydroxy compounds. These complexes are strongly acidic but do not degrade the reacting materials. Other suitable catalysts for the reaction include aluminum chloride, methanesulfonic acid, zinc chloride, dibutyltin diacetate, etc.

It is absolutely necessary to carry out the reaction at an elevated temperature because of the low solubility of these compounds in the acid medium. The aldoses alone are quite insoluble in the aliphatic acids; however, a mixture of glucose and urea, for example, dissolves in acetic acid at a temperature of about 85° C. In the process of our invention, the aldose and urea are heated to a temperature of about 70 to 90° C. under reduced pressure. The water formed in the reaction is removed as soon as it is formed along with some of the glacial acetic acid. The glacial acetic acid is replaced by continuous addition of fresh glacial acetic acid to the reaction vessel. Although temperatures of 70 to 90° C. are preferred for operation at a pressure of about 300 mm. of mercury, satisfactory yields can be obtained in operation at temperatures of 50 to 110° C. and pressures below 650 mm. of mercury.

The reaction time is crucial in that the materials must be heated together for a period long enough to remove the water formed in the reaction. In the process of this invention, the amount of water removed can be determined as the reaction proceeds. When essentially all of the water formed has been recovered, the reaction is considered to be complete. Thus, satisfactory yields can be obtained in a reaction time of about 1 to 6 hours.

It is absolutely essential for the process of our invention to carry out the reaction at a reduced pressure. A pressure on the order of 300 mm. is relatively easy to achieve and is, therefore, the preferred pressure for the reaction. However, the reaction may be run at pressures down to 50 mm. if the temperature is reduced correspondingly.

To obtain a suitable yield of the product, the reactants must be present in at least a stoichiometric ratio; that is, two moles of aldose to one mole of urea. Because the reaction is reversible, the yield is improved if more than the number of moles of the aldose required are present in the reaction mixture. An excess of about 5 to 100 mole percent of the aldose gives satisfactory results. An excess of 10 to 15 mole percent is preferred.

The acid reaction medium must be present in sufficient quantity to enable the mixture to be stirred without undue difficulty. Thus, it is preferred to have a weight of low boiling aliphatic acid equal to the weight of the glucose present in the reaction mixture. However, satisfactory results can be obtained when a quantity equal to approximately 10% of the weight of the glucose is present. Good results are obtained when the quantity of acid present is equal to ten times the weight of the glucose.

The amount of catalyst to be used depends upon the catalyst and the aldose used in the preparation of the product, thus boric acid catalyzes the reaction when it is present in amount equal to about ½ to 5% (and more) of the amount of glucose present in the reaction. Because of the reaction conditions, gaseous catalysts such as sulfur dioxide would not be as desirable as the solid catalyst such as boric acid.

The crude product precipitates as the reaction proceeds and is separated by crystallization from the mixture on standing at room temperature or by cooling the reaction mixture. Isolation of the product diglucosylurea from the reaction mixture is accomplished by the standard methods well known to those versed in organic chemistry. The reaction mixture may be first diluted with a quantity of the reaction medium in which case the remainder of the product will be separated directly from the reaction mixture on cooling. The separation may also be assisted by the addition of a diluent such as an alcohol to promote crystallization and decrease the solubility of the product in the reaction mixture. The crude product is purified by recrystallization from a proper solvent such as aqueous methanol.

The purity of the diglycosylureas obtained can be readily determined by their optical properties. Thus the product of the condensation of α-D-glucose with urea either in an aqueous acid medium or in an organic acid medium, for example, is principally 1,3-bis-(β-D-glucopyranosyl)-urea. However, the other two isomers, namely 1,3-bis(α-D-glucopyranosyl)-urea and 1-(α-D-glucopyranosyl)-3(β-D-glucopyranosyl)-urea, possibly could be produced simultaneously and may be present in the crude mixture along with any unreacted glucose. All of these compounds by virtue of their asymmetric carbon atoms are optically active; that is, their aqueous solutions rotate the plane of polarized light. D-glucose is dextrorotary and its specific optical rotation at equilibrium is approximately $[\alpha]_D^{25} = +52.5°$. On the other hand, 1,3-bis-(β-D-glucopyranosyl)-urea is levorotary and its specific rotation is $[\alpha]_D^{25} = -38° \pm 2°$. The α,α-isomer of 1,3-diglucopyranosylurea can be expected to be dextrorotary while the α,β-isomer should be less dextrorotary than the α,α-isomer and more dextrorotary than the β,β-isomer. The presence of optically inactive contaminants will decrease the specific optical rotation of diglucosylurea. The presence of dextrorotary contaminants will decrease the negative optical rotation of diglucosylurea considerably more. Purity determinations based on the optical rotation of the diglucosylurea product provide a much more convenient method of determining its purity than, for instance, determination of the melting point. Diglucosylurea, for example, has no sharp melting point and decomposes gradually above 300° C.

The specific optical rotation of these compounds was used to determine the purity of the compounds as shown in the examples below. Any of the commercially available polarimeters can be used in making this determination.

The scope and utility of our invention is further illustrated by the following specific but non-limiting examples.

EXAMPLE I

The method of preparing diglucosylurea by the condensation of glucose with urea in glacial acetic acid at slightly reduced pressure is as follows: A mixture of α-D-glucose, urea, a weight of acetic acid about equal to the weight of α-D-glucose and a catalytic amount of boric acid (about 1.3% of the weight of the glucose) was heated to 90 to 95° C. with efficient stirring until a clear solution resulted. The pressure was then lowered to about 250 to about 300 mm. and the temperature decreased to about 75 to 85° C. The solvent distilled at a rate of 50 to 80 ml. per hour at this temperature and pressure. As the distillation proceeded, fresh glacial acetic acid was added in portions of 20 to 40 ml. whenever that volume of solvent had been removed. The distillate was analyzed with Karl Fischer reagent to determine the amount of water collected. When the amount of water recovered approached the calculated amount of water expected to be formed in the reaction, the reaction was stopped. This reaction time varied from 3 to 4 hours. At the end of this period the mixture was diluted with methanol and cooled to 5° C. for a period of about 20 hours. The crude product 1,3-bis(D-glucopyranosyl)-urea was recovered by filtration and was recrystallized from a mixture of water and methanol. The recrystallized product was filtered and dried at 80 to 120° C. in a vacuum oven to constant weight. The weight of the product was used in calculating the yield. The purity of the product was determined by its optical rotation using the technique described above. The data from three typical runs in which the glucose and urea were reacted in the ratio of 2 moles of glucose to 1 mole of urea is set out in Table I.

Table I

| Run No. | Moles of Reactants in grams | | Water Recovery in Percent | Yield of Crude Product in Percent | Yield of Pure Product in Percent | Specific Optical Rotation of Product $[\alpha]_D^{25°}$ |
|---|---|---|---|---|---|---|
| | α-D-Glucose | Urea | | | | |
| 1 | 0.830 | 0.418 | 81.5 | 70 | 61.1 | −33.8 |
| 2 | 0.830 | 0.418 | 87.5 | 69 | 59.8 | −33.9 |
| 3 | 0.830 | 0.418 | 64.3 | 71 | 58.6 | −31.0 |

It is apparent from the data presented above that yields of 1,3-bis(D-glucopyranosyl)-urea of the order of 60% can be obtained in this reaction.

EXAMPLE II

The effect of using an excess of glucose in the reaction was demonstrated in a series of runs in which the reaction was carried out in the presence of a 10% excess of glucose. In these runs the reaction conditions were the same as those set out in Example I except that the mixture of glucose, urea and acetic acid contained a 10% excess over the amount of glucose required for the stoichiometry of the reaction. A boric acid catalyst (about 1.3% of the weight of the glucose) was added and the mixture heated to 90–95° C. with stirring until a clear solution resulted. The pressure was then lowered to about 300 mm. and the temperature decreased to about 70–85° C. The solvent was distilled at a rate of 50–80 ml. per hour at this temperature and pressure. As the distillation proceeded, fresh glacial acetic acid was added in portions of 20–40 ml. whenever that volume of solvent had been removed. The distillate was analyzed with Karl-Fischer reagent to determine the amount of water collected. When the water recovered approached the calculated amount of water formed in the reaction, the reaction was stopped. This reaction time varied from 3 to 4 hours. The product was separated and purified using the techniques described in Example I. The data on these runs is summarized in Table II.

*Table II*

| Run No. | Moles of Reactants in grams | | Water Recovery in Percent | Yield of Crude Product in Percent | Yield of Pure Product in Percent | Specific Optical Rotation of Product $[\alpha]_D^{25°}$ |
|---|---|---|---|---|---|---|
| | α-D-Glucose | Urea | | | | |
| 1 | 0.919 | 0.418 | 86.4 | 74.6 | 63.4 | −33.3 |
| 2 | 0.919 | 0.418 | 98.0 | 75.0 | 60.6 | −34.2 |
| 3 | 0.919 | 0.418 | 100 | 76.5 | 66.4 | −32.2 |

It is apparent from an examination of these data that the addition of an excess of glucose in the reaction is advantageous. The yield of pure product increased to about 60–66% when a 10% excess of α-D-glucose was used in the reaction.

EXAMPLE III

The effectiveness of the boric acid as a catalyst was demonstrated in a run in which the α-D-glucose and urea were reacted in the presence of acetic acid without a catalyst. The reaction conditions were the same as those set out in Example I above except that no catalyst was added. In this run a mixture of 150 grams (0.836 mole) of α-D-glucose, 25 grams (0.418 mole) of urea and 160 ml. of acetic acid were added to a three-necked flask equipped with a stirrer and a thermometer. The flask was equipped to reduce the pressure and remove the water as it was formed in the reaction. The mixture was heated to about 90–95° C. with stirring until the reactants had dissolved in the glacial acetic acid. After the reactants had dissolved, the pressure was reduced to about 300 mm. and the temperature lowered to 80–85° C. A steady rate of distillation of 50–80 ml. per hour was maintained at this temperature and pressure. Fresh glacial acetic acid was added in portions of 20–40 ml. whenever the corresponding amount of solvent had been removed. The distillate was analyzed with Karl-Fischer reagent to determine the amount of water collected. When the water had been recovered quantitatively the reaction was stopped and the mixture cooled and diluted with methanol. The reaction was complete in 5.5 hours. The product was purified using the techniques described in Example I. A total of 65 grams corresponding to a 40.7% yield was recovered from this reaction. The specific optical rotation of the product was $[\alpha]_D^{24°}=-32.2$.

It is apparent from an examination of these data that boric acid is an excellent catalyst for the reaction. The yield of the pure diglucosylurea was increased from about 40% to about 60% by the use of boric acid catalyst. The purity of the product was also improved.

EXAMPLE IV

A run was completed in which dibutyltin diacetate was added to determine whether it had any catalytic effect. The reaction conditions were the same as those set out in Example I except that dibutyltin diacetate was added as a catalyst.

In this run a mixture of 150 grams (0.836 mole) α-D-glucose, 25 grams (0.418 mole) of urea, 160 ml. of acetic acid and 0.200 gram dibutyltin diacetate were added to a three-necked flask equipped with a stirrer and thermometer. The flask was equipped to reduce the pressure and remove the water that was formed in the reaction. The mixture was heated to about 90–95° C. with stirring until the reactants had dissolved in the acetic acid. After the reactants had dissolved, the heating was continued at a pressure of about 300 mm. and a temperature of about 80–85° C. A steady rate of distillation of 50–80 ml. per hour was maintained at this temperature and pressure. Fresh glacial acetic acid was added in portions of 20–40 ml. whenever the corresponding amount of solvent had been removed. The distillate was analyzed with Karl-Fischer reagent to determine the amount of water collected. When the water had been recovered essentially quantitatively, the reaction was stopped and the mixture cooled and diluted with methanol. The reaction was complete in 3 hours. The product was purified using the technique described in Example I. A yield of 38 grams corresponding to 23.3% yield was recovered from this reaction. The specific optical rotation of the product after purification was $[\alpha]_D^{24°}=-34.3$.

In a comparable run, aluminum chloride was evaluated as a catalyst using the technique set out above. A yield of 23.7% of the pure product having a specific optical rotation of $[\alpha]_D^{24°}=-29.4$ was recovered.

It is apparent from an examination of these data that boric acid is a much superior catalyst to aluminum chloride or dibutyltin diacetate under the conditions of this reaction. The aluminum chloride showed no particular catalytic effect and the catalytic effect of dibutyltin diacetate is questionable.

EXAMPLE V

Removal of water from the reaction as it is formed shifts the equilibrium so that it is not necessary to take precautions to minimize the effect of the reverse reaction. This was demonstrated by comparing a run in which glucose was reacted with urea in the presence of acetic acid without water removal and the results compared with the data set out in Example III.

In this run a mixture of 150 grams (0.836 mole) of anhydrous α-D-glucose was placed in a three-necked flask equipped with a stirrer and thermometer. A total of 25 grams (0.417 mole) of urea and 140 ml. of glacial acetic acid were added and the mixture heated at 80–85° C. with constant stirring. The glucose and urea dissolved after about 2½ hours at this temperature. At the end of the 8 hour period the mixture was cooled, diluted with 200 ml. of methanol and kept at 5° C. for a period of about 20 hours. The crude product, 1,3-bis-(D-glucopyranosyl)-urea was recovered by centrifuging and was recrystallized from a mixture of water and methanol. The recrystallized product was filtered and dried at 80–100° C. in a vacuum oven to constant weight. The weight of the product was 55 grams which represents a yield of 33.3% theoretical. The purity of the compound was determined by measurement of a specific optical rotation which, in this case, was $[\alpha]_D^{24°}=-34.3$.

When these results were compared with the results set out in Example III, it is apparent that an improved yield of the 1,3-bis-D-glucopyranosyl)-urea compound can be obtained by removing the water as it is formed. Thus the yield increased from about 33 to about 41%, an increase of 20%, when the water removal technique was used.

EXAMPLE VI

A detergent composition was prepared using the diglucosylurea intermediate of this invention and esterifying this compound to form the diglucosylurea laurate. The resulting product was compounded to form a detergent formulation. The composition was prepared by forming a 60% solid slurry containing about 40% sodium tripolysulfate, about 10% tetra-sodium pyrophosphate, about 10% sodium metasilicate pentahydrate, about 19.5% sodium sulfate, about 20% diglucosylurea laurate and about 0.5% sodium carboxymethylcellulose. This slurry was vigorously stirred at about 140° F. to form a homogeneous mixture. It was then dried in air at a temperature of about 350° F. with a moisture loss of about 40%. The resulting composition was recovered as a powder which possessed a high degree of detersive and foaming properties in both hard and soft water. The resulting detergent was shown to be effective for heavy duty cleaning purposes in tests of its cleaning properties using soiled cotton. This example illustrates one of the uses of the compound of this invention; that is, the use of the compound as an intermediate in the preparation of detergent formulations.

Obviously many modifications and variations of the invention as herein above set forth may be made without departing from the essence and scope thereof and only such limitations should be applied as are indicated in the appended claims.

What is claimed is:

1. A process for the preparation of diglycosylureas which comprises heating at least two moles of an aldose with one mole of urea at a pressure below about 650 mm. of mercury in the presence of a quantity of lower aliphatic acid having 2 to 4 carbon atoms equal to about 0.1 to ten times the weight of aldose present and recovering the product diglycosylurea.

2. A process for the preparation of diglycosylureas which comprises heating at least two moles of an aldose with one mole of urea at a pressure below about 650 mm. of mercury in the presence of a quantity of a lower aliphatic acid having 2 to 4 carbon atoms equal to about 0.1 to ten times the weight of the aldose present in the presence of a catalytic amount of an acid catalyst and recovering the product diglycosylurea.

3. A process for the preparation of 1,3-diglucosylurea which comprises heating at least two moles of glucose with one mole of urea at a pressure below about 650 mm. of mercury in the presence of a quantity of acetic acid equal to about 0.1 to ten times the weight of glucose present and recovering the product diglucosylurea.

4. A process for the preparation of 1,3-diglucosylurea which comprises heating at least two moles of glucose with one mole of urea at a temperature of 75–90° C. and a pressure below about 650 mm. of mercury for a period of 1 to 24 hours in the presence of a quantity of acetic acid equal to about 0.1 to ten times the weight of glucose present and in the presence of a catalytic amount of boric acid and recovering the product 1,3-diglucosylurea.

5. A process for preparing 1,3-diglucosylurea which comprises heating at least two moles of glucose with one mole of urea at a temperature of 60 to 110° C. at a pressure of 200 to 600 mm. of mercury for a period of 1 to 6 hours in the presence of a quantity of acetic acid equal to 0.1 to ten times the weight present in the presence of a quantity of boric acid catalyst equal to about 0.5 to 5% of the weight of glucose present, cooling the reaction mixture, recovering the crude 1,3-diglucosylurea and purifying said product by recrystallization.

6. A process for the preparation of 1,3-diglucosylurea which comprises heating at least two moles of glucose with one mole of urea at a temperature of 60 to 110° C. at a pressure of 200 to 600 mm. of mercury for a period of 1 to 24 hours in the presence of a quantity of acetic acid equal to 0.1 to ten times the weight of glucose present and in the presence of a quantity of boric acid catalyst equal to about 0.5 to 5% of the glucose present, cooling the reaction mixture to a temperature below 15° C., separating the crude 1,3-diglucosylurea and purifying the product by recrystallization from an aqueous methanol solution.

No reference cited.